C. G. CROSS.
Improvement in Machines for Welding Plow-Irons.
No. 126,188. Patented April 30, 1872.
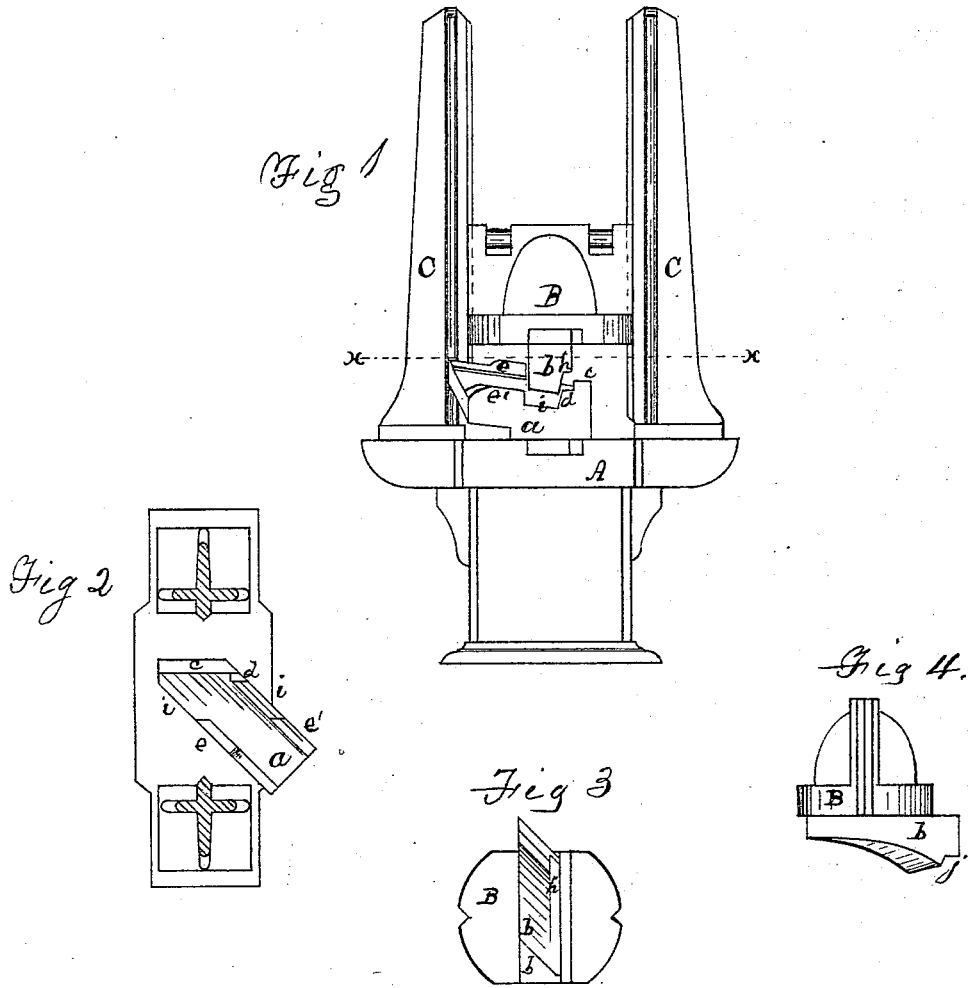
Witnesses
Inventor
Christopher G. Cross

UNITED STATES PATENT OFFICE.

CHRISTOPHER G. CROSS, OF CHICAGO, ILLINOIS, ASSIGNOR TO CONRAD FURST AND DAVID BRADLEY, OF SAME PLACE.

IMPROVEMENT IN MACHINES FOR WELDING PLOW-IRONS.

Specification forming part of Letters Patent No. 126,188, dated April 30, 1872.

I, CHRISTOPHER G. CROSS, of Chicago, Illinois, have invented certain new and useful Dies to be used in the Manufacture of Plows; and the following is a full, clear, and exact description thereof, reference being had to the accompanying drawing making part of this specification, in which—

Figure 1 is a side elevation, showing the dies, and bed and standards with which they are used; Fig. 2, a horizontal section on line $x\,x\,y$, Fig. 1, the upper die and head being removed; Figs. 3 and 4, details of the upper or movable die and head.

Heretofore plowshares have always been welded to the point or land-side bar by hand.

The object of my invention is to do this work by machinery, which I accomplish by the use of dies of peculiar form and construction.

In the drawing A represents the bed, in which the lower die is secured; B, the head, to which the movable die is attached; C, the standards and guides for the head B. These parts are old. $a$ is a stationary die adapted to receive the plowshare and the point or land-side bar, which is to be welded to the share. Upon each side is a flange, $e\,e'$, extending part of the way from one end to the other to assist in holding the share firmly in place; and $i\,i$ are recesses to receive the lower and main part of the movable die $b$ when it descends, and aid in keeping it true and in place. At the inner end of this die $a$ is projection $c$, against which the end of the share and the side of the point or bar are placed when in position to be welded; and $d$ is a small projection on the front edge of the die $a$, against which the heel of the "point" rests when a short plow-point is used. The upper and movable die $b$ is curved to fit the share, (see Fig. 4,) and has a shoulder, $h$, along one side, and another shoulder, $j$, across the front end.

In use the share and plow-point are heated to the welding temperature. The share is placed in the die $a$, and the plow-point is placed in position at the end of the share and against the projection $c$, its heel resting against $d$. Then the head and die B $b$, having been raised to a proper height, are allowed to fall. The lower part of the die $b$ will pass down by the side of the point; the shoulder $h$ will come in contact with the point; and by a single blow the parts will be usually welded together. A second blow can be given, if required. The part $c$ and the form of the die $b$ will hold all of the metal in the "point" in place and prevent its spreading, except at the extreme point, where a little spreading is desirable.

If a long point or land-side bar is to be welded to the share the die $a$ must be made without the projection $d$; then that part of the point or bar not in contact with the share can be allowed to extend out beyond the die while the welding is being done. The dies $a\,b$ are, respectively, secured in the base A and head B in the usual manner.

I do not limit myself to the exact form of dies shown, as the form must be somewhat varied to comform to shares and land-sides of more or less modified form; otherwise the dies will be made as shown and described.

The movable die can be operated in the usual manner.

What I claim as new is as follows:

The dies $a\,b$, constructed and adapted to operate substantially as and for the purposes specified.

CHRISTOPHER G. CROSS.

Witnesses:
E. A. WEST,
O. W. BOND.